Jan. 21, 1936.  A. HILYARD  2,028,450
PLANT THINNING IMPLEMENT
Filed Nov. 6, 1934   2 Sheets-Sheet 1
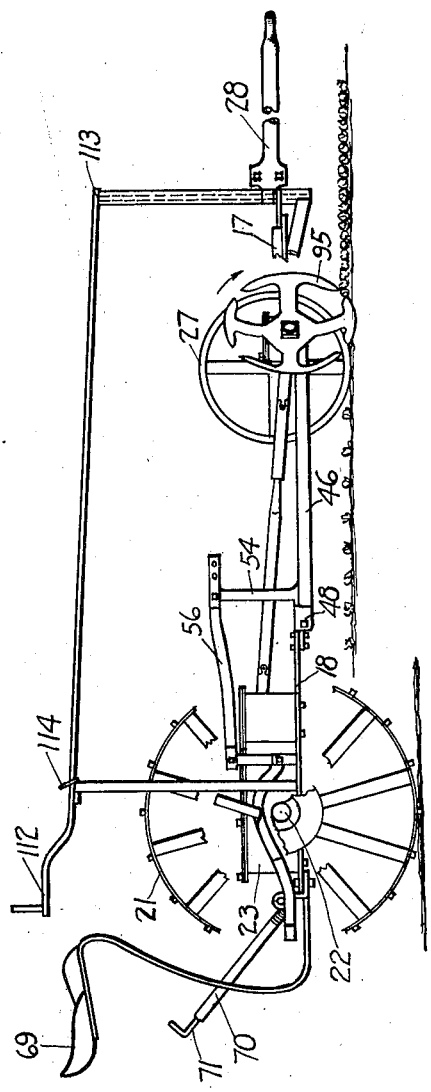
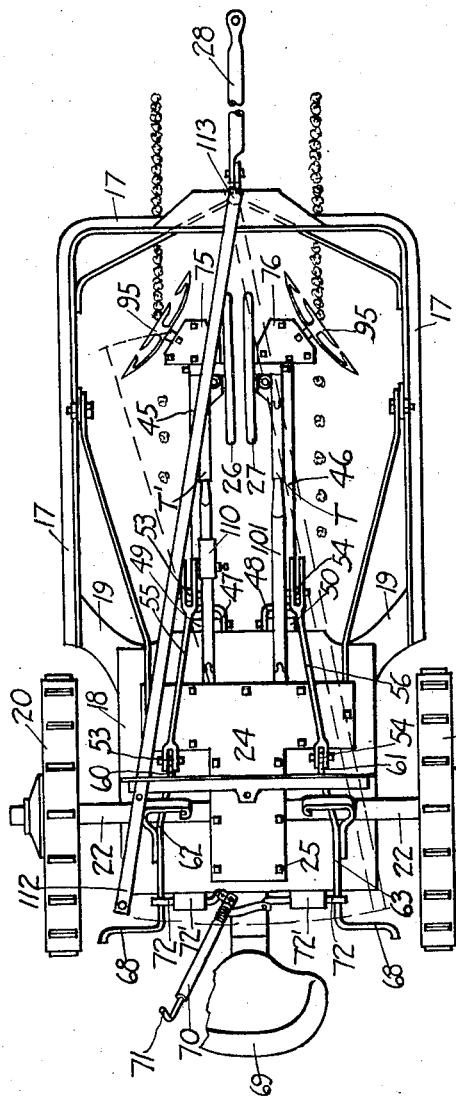
INVENTOR.
Albert Hilyard
BY Francis H. Davis
ATTORNEY.

Jan. 21, 1936. A. HILYARD 2,028,450
PLANT THINNING IMPLEMENT
Filed Nov. 6, 1934 2 Sheets-Sheet 2
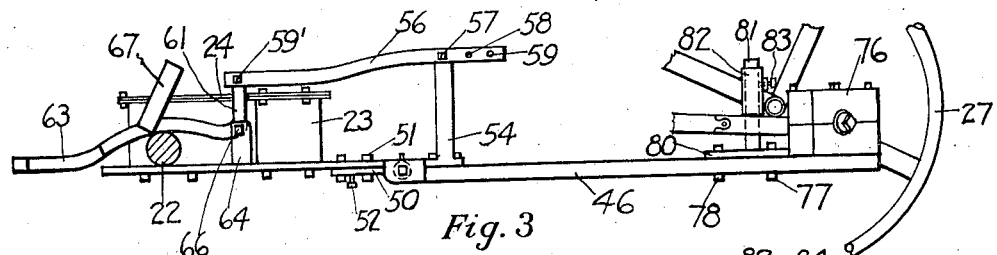
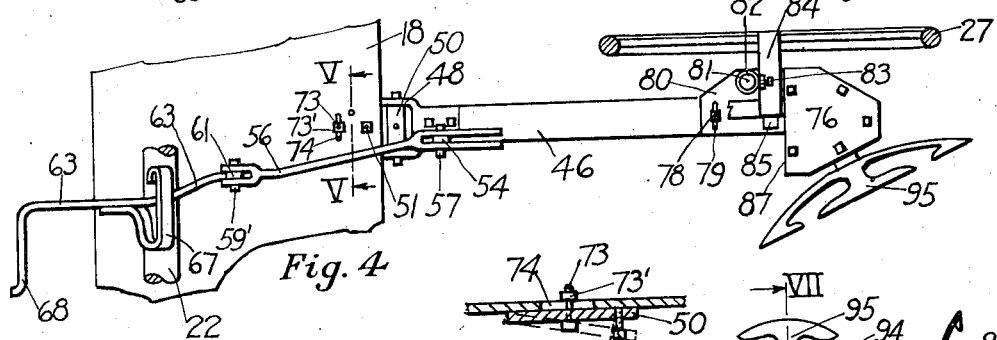
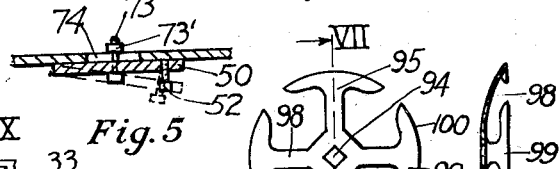
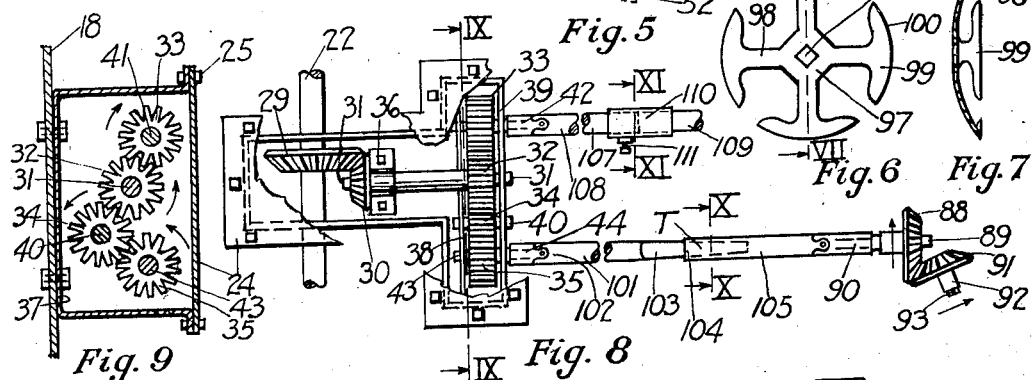
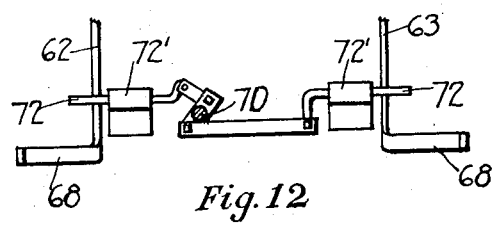
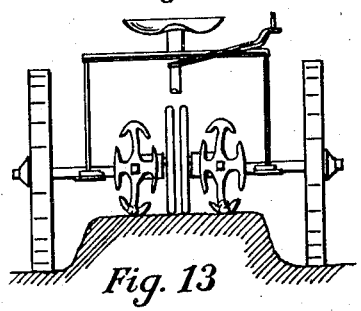
INVENTOR.
Albert Hilyard
BY Francis H. Davis
ATTORNEY.

Patented Jan. 21, 1936

2,028,450

UNITED STATES PATENT OFFICE 2,028,450

PLANT THINNING IMPLEMENT

Albert Hilyard, Salinas, Calif.

Application November 6, 1934, Serial No. 751,796

8 Claims. (Cl. 97—14)

This invention relates to plant-thinning implements, and more particularly to an implement adapted to operate on long mounded beds wherein such seed as lettuce, beets or the like are seeded in double parallel rows which seed when sprouted need to be thinned to leave individual plants spaced at required intervals apart lengthwise of the bed; a spacing that may vary for different species of plants, climatic conditions, the nature of the soil, or the individual ideas of the husbandman.

Said rows of plants may also be planted at different widths apart. The culture of such plants on mounded beds is generally practiced in California where the valleys existing between said mounded beds are used for irrigational flow. The ground-engaging wheels of the present implement are preferably spaced to track in the valleys adjacently flanking the bed to be operated on.

The objects of my invention include the following desiderata:—

To provide an implement that is travelable longitudinally over a mounded bed whereon are two parallel rows of plants to be thinned. Said implement being furnished with twin thinning cutters adapted to operate independently and simultaneously to cut away surplus plants and leave individual plants at spaced intervals longitudinally of each said plant row, said cutters being arranged to leave growing plants on each individual row in zig-zag relationship to each other.

To provide articulated twin arms to carry revoluble thinning cutters adapted to thin said plants, and means to revolve said cutters at various levels, and at various widths apart from each other, together with the ability to incline said cutters so as to toe-in forwardly at various angles oblique to the longitudinal axis of said bed, and means to set said arms at various radial settings to vary the verticality of the thinning cutters.

To provide pedally-operable means to lower or raise said thinning cutters, together with other objects and advantages hereinafter appearing, illustrated in the accompanying drawings attached hereto and made part hereof, in which:—

Figure 1 is an elevational view of an implement according to my invention.

Figure 2 is a top plan view of the above.

Figure 3 is a side elevational detail of the mechanism for raising or lowering the cutter, with parts removed for clarity.

Figure 4 is a top plan view of Figure 3.

Figure 5 is a section taken on the line V—V of Figure 4.

Figure 6 is an outside elevational view of a cutter.

Figure 7 is a section taken on the line VII—VII of Figure 6.

Figure 8 is a general plan view of the gearing assembly forming part of the gear train for driving the cutters.

Figure 9 is a section taken on the line IX—IX of Figure 8.

Figure 10 is a section taken on the line X—X of Figure 8.

Figure 11 is a section taken on the line XI—XI of Figure 8.

Figure 12 is a detail view showing the detents engaging the pedals to lock the cutters in raised position.

Figure 13 is a front elevational view of the implement.

Like reference indicia refer to like parts throughout the several views.

In carrying out my invention I provide a structural frame 17 that is disposed forward of a bed-plate 18 and which may be connected therewith by members as 19—19 either by welding or other suitable means.

The implement is supported at the rear on ground-engaging wheels as 20—21 that are provided with a drive axle 22 which passes transversally through a gear-box 23 which is attached to said bed-plate, as is well shown in Figures 1 and 2, said box having a removable cover 24 secured thereto by screws as 25. The forward portion of the implement is supported on respective ground-engaging wheels 26 and 27 when in the operative position and by a draw-bar 28 when in the inoperative position which is attained in a novel manner, later to be described.

Said rear wheels are a revoluble fit loose upon the drive axle 22 and are arranged to be connected with said drive axle by the usual escapement, so that when the implement is traveled forward rotary movement will be imparted to the axle 22 and when the implement is traveled backward the wheels 20 and 21 will turn upon the axle 22 without imparting movement thereto. Said escapement devices being well known and forming no part of the present invention it is unnecessary to describe them in detail.

Referring now to Figure 8 where the cover 24 is partially removed it will be noted that a bevel master-gear 29 is carried by the axle 22, being fast thereto. Said gear engages a bevel pinion 30 fast to a shaft 31 that carries a spur pinion 32 fast thereto, which pinion intermeshes to the left with a spur pinion 33, and at the lower right engages with an idle pinion 34 which, in turn, engages with a pinion 35 that is preferably on the same horizontal plane as the pinion 33. The shaft 31, next the pinion 30, is journaled in a bearing 36 secured to a bottom 37 of said gear-box. The far end of said shaft carries the spur pinion 32 that is journaled in a vertical partition 38 and in an outer end wall 39 of said gear-box. The idle pinion 34 is fast to a shaft 40, also journaled in said partition and wall. The pinion 33 is fast to a stub shaft 41 also journaled in said partition and wall, the outer end of said shaft making suitable connection with a universal joint member 42. The pinion 35 is fast to a stub shaft 43 which is journaled in said partition and wall and makes suitable connection with a universal joint member 44.

Respective arms as 45 and 46 are pivotally connected with the bed-plate 13 by hinge elements as 47 and 48 which permit vertical movement of said arms. Members as 49 and 50 of said respective hinges are arranged to be set sloping downwardly and outwardly by adjustment of a bolt 51 and a set-screw 52, as is well illustrated in Figures 5 and 3. Respective cranks as 53 and 54 are connected to the respective arms 45 and 46 at points in advance of said hinge elements; said cranks extend upwardly and make pivotal connection with respective links as 55 and 56 pivotally secured thereto by bolts as 57; adjustment holes as 58 and 59 being provided to vary the length of said links. The respective rear ends of said links are pivotally connected by bolts as 59'—59' with bell-crank members as 60 and 61 which are integral with respective pedals 62 and 63 that are secured to supports as 64 which are suitably connected to said bed plate, said cranks being mounted on pivots as 66, said pedals being provided with foot rests as 67 and with outwardly disposed members as 68—68, all within convenient reach of the feet of an operator when seated in a seat 69. A turnable shaft 70 provided with a handle 71 makes linked connection with respective detents 72—72 slidably mounted in bearings as 72'—72' and adapted to slide outwardly and inwardly in unison when the handle 71 is suitably moved to left or right.

The respective hinge members 47 and 48 pivoted on bolts as 51, are adapted to be set at points outwardly divergent from parallelism with the longitudinal axis of the implement by provision of stud-bolts as 73 secured vertically to said bed-plate and which protrude upwardly through slots as 74—74 formed in said members. Said base and members being lockable together by application of nuts as 73' to the bolts 73 when the required setting is had.

The distal ends of the respective arms 45 and 46 mount respective gear-cases as 75 and 76, each said gear-case being secured to said end by a pivotal bolt 77 and a bolt 78 which engages a slot 79 formed in a tank 80 of the respective gear-cases, thus providing radial means to vary the adjustment of said gear-cases with respect to the longitudinal axis of the implement, all well shown in Figures 3 and 4. Each said tang is provided with a post as 81 of round cross-section and rising perpendicularly therefrom to a suitable height to carry a quill 82 adapted to slide over said posts, being a turnable fit thereon, and arranged to be locked to said posts at various settings, which may well be done by set screws as 83. Said quills are fastened vertically to the outer sides of horizontal bearings as 84—84 which journal axles as 85 that mount the respective ground-engaging wheels 26—27. It will be noted that by the above means of mounting said wheels they may be set at various levels with respect to said arms and, when sufficient space is provided between the bearings 84—84 and a rear wall 87—87 of either of said gear-cases, the respective wheels may be adjusted parallel with respect to the axis of the implement when thrown out of adjustment by spacing said arms wider apart. Each gear-case is provided with a bevel pinion as 88 fast to a shaft 89 which is journaled in said rear wall, extends rearwardly therefrom and makes suitable connection with a universal-joint member 90. The pinion 88 engages a pinion 91 fast to a shaft 92 journaled in an outer wall of said gear-case, protruding outwardly therefrom and provided with a square portion 93 adapted to fit a square hole 94 of a cutter 95. Obviously said cutter may be attached so as to be driven by the shaft 92 by other means than those above-described without departing from the spirit of my invention. The cutter 95 may be removably secured to said square portion by a linchpin or by other suitable means.

The cutters 95 preferably comprise a hub portion 97, a concentric square hole 94, a plurality of inwardly-concaved spokes 98 provided with individual cutting blades 99 having peripheral cutting edges 100 preferably beveled outwardly.

A rod 101 has a complemental universal-joint member 102 connected to the member 44, and at a point forward thereof is provided with a telescopic joint element T comprising a square portion 103 adapted to engage a square socket 104 formed on the cooperative end of the rod 105, and arrangement of parts adapting the rod 101 to transmit rotary movement and to compensate the combined length of said rods to their axial variation when the arm 46 is at various levels due to unevenness of the ground or when the implement is in the inoperative position, or while operating at different levels. The distal end of the rod 105 makes universal connection with the complemental member 90 fast to the adjacently-protruding end of the shaft 89.

A rod 107 has a complemental universal-joint member 108 connected to the member 42, and, at a point forward thereof, is connected to a rod 109 by a coupling 110 fast to the rod 109. A set-screw 111 couples said socket to the received end of the rod 107 at relatively different radial points, thus allowing the cutter blades, carried by the arm 45, to act at varied intervals with respect to the cutter blades carried by the arm 46. As shown in Figure 2 it will be noted that a telescopic element T' is provided to connect the related rods, said element being a duplicate of the element T above-described.

Means as a handle 112, pivoted at 113 enable the operator to swing the forward portion of the implement right or left to follow any deviation of the plant rows from straight lines. A bridle 114 limits the throw of said lever.

There are many slight and immaterial changes which might be resorted to in carrying out the present invention without detracting from any of its advantages, and hence it is to be understood that I do not limit myself to the precise construction herein shown and described, but consider myself entitled to all such variations as properly come within the spirit and scope of the invention.

Having thus described my invention, what I claim as new and desire to secure by Letters Patent, is:—

1. In an implement adapted to thin a double row of plants growing on a narrow mounded bed, a structural frame, a main axle journaled on the frame and carrying a pair of drive wheels, a driver fast to the axle intermediate said wheels, a pair of normally parallel forwardly-extended arms hingedly connected with a rearward portion of the frame and adapted for limited vertical movement of their respective free ends, said arms being disposed one on each side of the longitudinal axis of the frame, a pair of intermeshed gears mounted on the free end of the far arm, a pair of intermeshed gears mounted on the free end of the near arm, each pair of gears being adapted to revolve a rotary cutter: a train of gearing operably engaging said driver, one actuator of said train being adapted and arranged to distribute rotary power from the far side of said axis, and another actuator of said train being adapted to distribute rotary power from the near side of said axis, a revoluble member driven by the far actuator and operably connected to drive said gears mounted on the free end of said far arm, a revoluble member driven by the near actuator and operably connected to drive said gears mounted on the free end of said near arm: a supporting wheel operably connected with the free end of each said arm, crank means adapted to raise said wheels from the ground, means to lock and release said raising means, a draw-bar carried by a forward portion of the frame and adapted for its support when traveling with said wheels elevated.

2. In an implement as specified in claim 1, said train of gearing operably connected to a far actuator adapted to drive a revoluble member in a clockwise direction, when viewed from the rear, and to a near actuator adapted to drive a revoluble member in the opposite direction.

3. A plant thinning implement, comprising in combination, a structural frame, a main axle journaled on the frame and carrying a pair of drive wheels, a driver on the axle, a pair of arms extending forwardly from the frame one on each side of the longitudinal axis of the implement, gears mounted on the forward end of the far arm and adapted to drive a plant thinning cutter on the far side of a bed, gears mounted on the forward end of the near arm and adapted to drive a plant-thinning cutter on the near side of a bed, a far actuator adapted to distribute rotary power, a near actuator adapted to distribute rotary power: a revoluble drive element connected rearwardly to the far actuator by a universal joint and connected forwardly by a universal joint connected to gearing adapted to drive a plant-thinning cutter on the far side of a bed, a revoluble drive element connected rearwardly to a near actuator by a universal joint and connected forwardly by a universal joint connected to gearing adapted to drive a plant-thinning cutter on the near side of a bed.

4. In an implement as specified in claim 3, comprising a pair of revoluble drive elements, one said element transversely severed into two lengths, a socket coupling fixed to one end of said lengths and adapted to receive the adjacent end of the other length, and means to lock said sections together at different radial settings.

5. In a plant-thinning implement, a structural frame, a far arm connected to a rearward portion of the frame by a hinge adapting said arm for limited vertical movement, pivotal means permitting the hinge to be set to adjust the far end of the arm at different distances outwardly from the longitudinal axis of the implement and means arranged to deflect the outer portion of said hinge from the horizontal, and means to lock said hinge at different deflected points; a near arm connected to a rearward portion of the frame by a hinge adapting said arm for limited vertical movement, pivotal means permitting the hinge to be set to adjust the far end of the arm at different distances outward from the longitudinal axis of the implement, and means arranged to deflect the outer portion of said hinge from the horizontal, and means to lock said hinge at different deflected points.

6. In an implement as specified in claim 1, the combination with one said elevatable arm disposed on the far side of the longitudinal axis of the implement, a gear-case pivotally connected to the distal end of said arm and arranged to be set at various angles divergent from the longitudinal axis of said arm, a vertical post carried by the case structure, a quill slidable on said post and adaptable for radial and for vertical adjustments thereon, locking means to maintain said adjustments, a transverse quill-bearing secured to the former quill and adapted to journal the axle of a normally vertical supporting-wheel disposed adjacent said longitudinal axis; and with another gear-case pivotally connected to the distal end of said elevatable arm disposed on the near side of the longitudinal axis of the implement, said case arranged to be set at various angles divergent from the longitudinal axis of said arm, a vertical post carried by the case structure, a quill slidable on said post and adapted for radial and for vertical adjustments thereon, locking means to maintain said adjustments, a transverse quill-bearing secured to the former quill and adapted to journal the axle of a normally vertical supporting-wheel disposed in juxtaposition with the former wheel.

7. In a plant-thinning implement in combination with a structural frame, a main axle journaled on the frame and carrying a pair of drive wheels, a driver on the axle, means operably connecting the driver with a train of gears comprising a far and a near actuator, a universal joint connecting the far actuator with the rear end of a revoluble member, a universal joint connecting the forward end of the member with gearing adapted to drive a thinning cutter; and a telescopic drive-joint provided in the member intermediate said respective universal joints; a universal joint connecting the near actuator with the rear end of a revoluble member, a universal joint operably connecting said member forwardly with gearing adapted to drive a thinning cutter; and a telescopic drive-joint provided in the member intermediate said respective universal joints.

8. In a plant-thinning implement, in combination with a structural frame, a main axle journaled on the frame and carrying a pair of drive wheels, twin forwardly-directed elevatable arms hinged to the frame and an uprising crank carried by each arm forward of said hinge, a driver's seat rearward of said axle, a link extending rearwardly from each crank, a supplemental-crank pivotally connected to the rear end of each said link, a treadle means carried by the frame and pivotally connected to said supplemental-cranks, said means arranged to elevate said arms when pressed upon, and means to lock and release said treadles.

ALBERT HILYARD